United States Patent
Murai et al.

(10) Patent No.: US 8,545,783 B2
(45) Date of Patent: Oct. 1, 2013

(54) ACID GAS ABSORBENT, ACID GAS REMOVAL METHOD, AND ACID GAS REMOVAL DEVICE

(75) Inventors: Shinji Murai, Sagamihara (JP); Yukishige Maezawa, Hachioji (JP); Yasuhiro Kato, Kawasaki (JP); Takehiko Muramatsu, Yokohama (JP); Masatoshi Hodotsuka, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/474,982

(22) Filed: May 18, 2012

(65) Prior Publication Data
US 2012/0308451 A1    Dec. 6, 2012

(30) Foreign Application Priority Data

May 30, 2011   (JP) ................................ P2011-120392

(51) Int. Cl.
*B01D 53/62* (2006.01)
*C07C 211/33* (2006.01)
*C09K 3/00* (2006.01)

(52) U.S. Cl.
USPC ............ 423/228; 252/189; 252/190; 564/462

(58) Field of Classification Search
USPC ................. 423/228; 252/189, 190; 422/168; 564/462
See application file for complete search history.

(56) References Cited

U.S. PATENT DOCUMENTS 4,112,052 A    9/1978   Sartori et al.
4,405,584 A *  9/1983   Foroulis .......................... 423/228

(Continued)

FOREIGN PATENT DOCUMENTS

EP    0 588 175 A2   3/1994
FR    1539419        9/1968

(Continued)

OTHER PUBLICATIONS

Murai, S. et al., "Acid Gas Absorbent, Acid Gas Removal Method, and Acid Gas Removal Device," U.S. Appl. No. 13/332,018, filed Dec. 20, 2011.

(Continued)

*Primary Examiner* — Timothy Vanoy
(74) *Attorney, Agent, or Firm* — Finnegan, Henderson, Farabow, Garrett & Dunner, L.L.P.

(57) ABSTRACT

There is provided an acid gas absorbent having excellent performance of absorbing acid gas such as carbon dioxide, and an acid gas removal device and an acid gas removal method using the acid gas absorbent. An acid gas absorbent of an embodiment contains at least one type of tertiary amine compound represented by the following general formula (1).

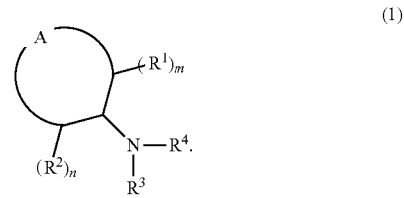

(1)

(In the above formula (1), the cycle A represents a cyclic structure whose carbon number is not less than 3 nor more than 8. $R^1$, $R^2$ and $R^3$ each represent an alkyl group whose carbon number is 1 to 4, and $R^4$ represents a hydroxyalkyl group. $R^1$ and $R^2$ are groups coupled to carbon atoms adjacent to a carbon atom forming the cycle A and coupled to a nitrogen atom.)

9 Claims, 1 Drawing Sheet

(56) References Cited

U.S. PATENT DOCUMENTS

| | | | |
|---|---|---|---|
| 4,483,833 A | 11/1984 | Stogryn et al. | |
| 4,494,983 A * | 1/1985 | Eicken et al. | 504/340 |
| 5,618,506 A | 4/1997 | Suzuki et al. | |
| 6,036,931 A | 3/2000 | Yoshida et al. | |
| 6,207,121 B1 | 3/2001 | Rooney | |
| 6,436,174 B1 | 8/2002 | Grossmann et al. | |
| 2009/0291874 A1 | 11/2009 | Bara et al. | |
| 2010/0180764 A1 | 7/2010 | Inoue et al. | |
| 2010/0192770 A1 | 8/2010 | Andarcia et al. | |

FOREIGN PATENT DOCUMENTS

| | | |
|---|---|---|
| FR | 2100475 | 3/1972 |
| JP | 2871334 | 1/1999 |
| JP | 2002-525195 | 8/2002 |
| JP | 2008-307519 | 12/2008 |
| JP | 2011-521778 | 7/2011 |
| WO | WO 02/09849 A2 | 2/2002 |

OTHER PUBLICATIONS

Search Report issued by the European Patent Office on Oct. 10, 2012, for European Patent Application No. 12169120.8.

Leffler et al., "Alkamine Esters: Novocaine Analogs. III," retrieved from the internet at URL:http://pubs.acs.org/doi/pdf/10.1021/ja01328a052 (Jan. 11, 1933), pp. 365-370.

\* cited by examiner

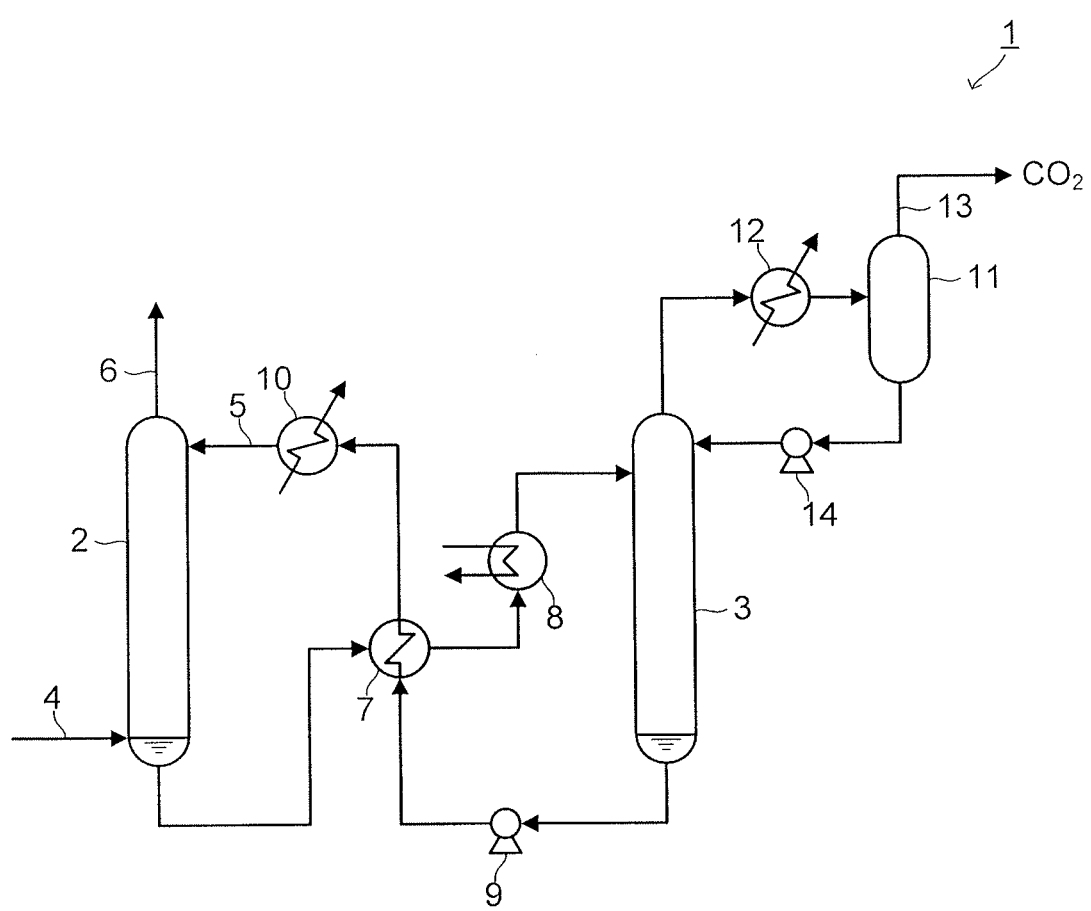

ACID GAS ABSORBENT, ACID GAS REMOVAL METHOD, AND ACID GAS REMOVAL DEVICE

CROSS-REFERENCE TO RELATED APPLICATION

This application is based upon and claims the benefit of priority from the prior Japanese Patent Application No. 2011-120392, filed on May 30, 2011; the entire contents of which are incorporated herein by reference.

FIELD

Embodiments described herein relate generally to an acid gas absorbent, an acid gas removal method, and an acid gas removal device.

BACKGROUND

In recent years, a greenhouse effect resulting from an increase of a carbon dioxide ($CO_2$) concentration has been pointed out as a cause of global warming phenomena, and there is an urgent need to devise an international countermeasure to protect environment in a global scale. Industrial activities have a large responsibility as a generation source of $CO_2$, and there is a trend to suppress discharge of $CO_2$.

As technologies to suppress the increase of the concentration of acid gas, typically, $CO_2$, there are a development of energy saving products, a separation and recovery technology of discharged acid gas, technologies to use the acid gas as a resource and to isolate and store the acid gas, a switching to alternate energies such as natural energy, atomic energy, and so on which do not discharge the acid gas, and so on.

As separation technologies of the acid gas studied up to now, there are an absorption process, a suction process, a membrane separation process, a cryogenic process, and so on. Among them, the absorption process is suitable for processing a large amount of gas, and its application in a factory, a power station is considered.

Accordingly, a method in which exhaust gas generated when fossil fuel (coal, coal oil, natural gas, and so on) is burned is brought into contact with a chemical absorbent, whereby $CO_2$ in exhaust combustion gas is removed and recovered, and further a method storing the recovered $CO_2$ are performed throughout the world in a facility such as a thermal power station using the fossil fuel. Besides, to remove acid gas such as hydrogen sulfide ($H_2S$) in addition to $CO_2$ by using the chemical absorbent has been proposed.

In general, alkanolamines represented by monoethanolamine (MEA) have been developed from the 1930s as the chemical absorbent used in the absorption process, and they are still used at present. This method is economical and it is easy to increase the removal device in size.

As existing and widely used alkanolamines, there are monoethanolamine, 2-amino-2-methylpropanolamine, methylaminoethanol, ethylaminoethanol, propylaminoethanol, diethanolamine, bis(2-hydroxy-1-methylethyl)amine, methyldiethanolamine, dimethylethanolamine, diethylethanolamine, triethanolamine, dimethylamino-1-methylethanol, and so on.

In particular, ethanolamine being primary amine has been widely used because their reaction rates are fast. However, there are problems that this compound has corrosiveness, is easily deteriorated, and require high energy for regeneration. On the other hand, methyldiethanolamine has low corrosiveness and requires low energy for regeneration, but has a defect that an absorption speed is low. Accordingly, a development of a new absorbent in which these points are improved is required.

In recent years, a study on particularly alkanolamine having structural steric hindrance, among amine based compounds, is vigorously tried as the absorbent of acid gas. Alkanolamine having the steric hindrance has merits that selectivity of acid gas is very high and the energy required for regeneration is small.

The reaction speed of the amine based compound having the steric hindrance depends on a degree of reaction hindrance determined by the steric structure thereof. The reaction speed of the amine based compound having the steric hindrance is lower than that of the secondary amine, for example, such as methylethanolamine and diethanolamine, but higher than that of the tertiary amine such as methyldiethanolamine.

On the other hand, a method in which a cyclic amine being an amine based compound having a structure different from that of alkanolamines is used as the absorbent is also known.

BRIEF DESCRIPTION OF THE DRAWINGS

FIG. 1 is a schematic diagram of an acid gas removal device according to an embodiment.

DETAILED DESCRIPTION

However, these technologies are still insufficient in terms of acid gas absorption capacities such as an absorption amount of acid gas, an absorption speed of acid gas, and heat of reaction at the time of the absorption of acid gas, and further improvement of the gas absorption capacities is required.

A problem to be solved by the present invention is to provide an acid gas absorbent excellent in acid gas absorption capacities, whose absorption amount and absorption speed of acid gas such as carbon dioxide are high, and which generates small heat of reaction when absorbing acid gas, and an acid gas removal device and an acid gas removal method using the acid gas absorbent.

An acid gas absorbent according to an embodiment includes at least one type of tertiary amine compound represented by the following general formula (1).

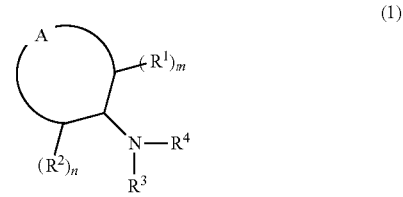

(1)

(In the above formula (1), the cycle A represents a cyclic structure whose carbon number is not less than 3 nor more than 8. $R^1$ and $R^2$ each represent an alkyl group whose carbon number is 1 to 4, $R^3$ represents an alkyl group whose carbon number is 1 to 4, and $R^4$ represents a hydroxyalkyl group. $R^1$ and $R^2$ are groups coupled to carbon atoms adjacent to a carbon atom forming the cycle A and coupled to a nitrogen atom. $R^1$ and $R^2$ may be the same or may be different. "m" and "n" each represent an integer number of 0 (zero) to 2, and $1 \leq m+n \leq 4$.)

An acid gas removal method according to an embodiment includes bringing gas containing acid gas into contact with the acid gas absorbent according to the above-described embodiment to remove the acid gas from the gas containing the acid gas.

An acid gas removal device according to an embodiment is an acid gas removal device removing acid gas from gas containing the acid gas, the device including: an absorption tower bringing the gas containing the acid gas into contact with the acid gas absorbent according to the above-described embodiment to remove the acid gas from the gas; and a regeneration tower removing the acid gas from the acid gas absorbent absorbing the acid gas, and regenerating the acid gas absorbent that is to be reused at the absorption tower.

Hereinafter, embodiments of the present invention will be described in detail. An acid gas absorbent according to an embodiment is characterized in including at least one type of tertiary amine compound represented by the following general formula (1).

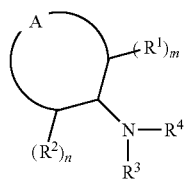

(1)

(In the above formula (1), the cycle A represents a cyclic structure whose carbon number is not less than 3 nor more than 8. $R^1$ and $R^2$ each represent an alkyl group whose carbon number is 1 to 4, $R^3$ represents an alkyl group whose carbon number is 1 to 4, and $R^4$ represents a hydroxyalkyl group. $R^1$ and $R^2$ are groups coupled to carbon atoms adjacent to a carbon atom forming the cycle A and coupled to a nitrogen atom. $R^1$ and $R^2$ may be the same or may be different. "m" and "n" each represent an integer number of 0 (zero) to 2, and 1≤m+n≤4.)

Conventionally, it has been known that a steric hindrance held by an amino compound has a large influence on a product at a carbon dioxide absorption time, and plays an advantageous role on a generation of bicarbonate ion exhibiting low heat of reaction. For example, it is reported that N-isopropylaminoethanol having a branch structure exhibits low heat of reaction in an absorption reaction of carbon dioxide. Based on the above-stated information, the present inventor conducted studies to obtain a larger effect of the steric hindrance, and as a result, it has been found that it is possible to obtain further lower heat of reaction by using the compound represented by the above-stated general formula (1) (for example, N-(2-methyl cyclohexyl)-N-methylaminoethanol) than by using the conventional amino compound having the branch structure.

Namely, in the tertiary amine compound represented by the general formula (1), the cyclic structure (cycle A) with the carbon number of not less than 3 nor more than 8 with which the alkyl groups ($R^1$, $R^2$) whose carbon numbers are 1 to 4 are coupled, the alkyl group ($R^3$) whose carbon number is 1 to 4, and the hydroxyalkyl group ($R^4$) are each coupled to the nitrogen atom. In the tertiary amine compound represented by the above general formula (1), the alkyl groups $R^1$ and $R^2$ are coupled to the carbon atoms adjacent to the carbon atom forming the cycle A and coupled to the nitrogen atom.

As stated above, the tertiary amine compound represented by the general formula (1) in which the cyclic structure with the carbon number of not less than 3 nor more than 8 having the alkyl groups ($R^1$ and $R^2$) with the carbon numbers of 1 to 4 are directly coupled to the nitrogen atom has a structure with a large steric hindrance. Accordingly, it is conceivable that the bicarbonate ion is generated and the heat of reaction is reduced in a reaction between the tertiary amine compound represented by the general formula (1) and carbon dioxide ($CO_2$).

The tertiary amine compound represented by the general formula (1) (hereinafter, it is referred to as the tertiary amine compound (1)) is dissolved in a solvent, for example, such as water, and thereby, an acid gas absorbent whose absorption capacity for the acid gas is high can be obtained. In the following embodiment, a case when the acid gas is carbon dioxide will be described as an example, but the acid gas absorbent according to the embodiment is able to exhibit similar effects for other acid gas such as hydrogen sulfide.

In the above formula (1), $R^1$ and $R^2$ are groups coupled to the carbon atoms adjacent to the carbon atom forming the cycle A and coupled to the nitrogen atom. $R^1$ and $R^2$ are the alkyl groups whose carbon numbers are 1 to 4. $R^1$ and $R^2$ may either be the same or different.

As $R^1$ and $R^2$, usable are, for example, branched or linear alkyl groups such as a methyl group, an ethyl group, a propyl group, an isopropyl group, a butyl group, an isobutyl group, or a s-butyl group. In these alkyl groups, part of hydrogen atoms may be replaced by a group containing atoms of Si, O, N, S, or the like. Concrete examples of the group containing the atoms of Si, O, N, S, or the like are a silanol group, a hydroxyl group, an amino group, a mercapto group, and so on.

When the carbon numbers of $R^1$ and/or $R^2$ are over 4, hydrophobicity of the tertiary amine compound (1) becomes high, which might lower reactivity with the acid gas.

Among them, When $R^1$ and/or $R^2$ are/is the methyl group, the heat of reaction in the acid gas absorption reaction reduces and solubility in a solvent such as water is also maintained. Accordingly, it is possible to obtain high acid gas absorption performance.

"m" and "n" each represent an integer number of 0 (zero) to 2 and m+n is not less than 1 nor more than 4. When "m" or "n" is over 2 or when m+n is over 4, hydrophobicity of the tertiary amine compound (1) becomes high. This might lower reactivity with the acid gas. On the other hand, when m+n is "0" (zero), the steric hindrance of the whole molecules is small in the tertiary amine compound (1). Accordingly, it is not possible to sufficiently obtain the effect of reducing the heat of reaction. M+n is preferably not less than 1 nor more than 2.

The cycle A represents the cyclic structure whose carbon number is not less than 3 nor more than 8. Examples of the cycle A are a cyclopropyl group, a cyclobutyl group, a cyclopentyl group, a cyclohexyl group, a cycloheptyl group, and a cyclooctyl group. The cyclopropyl group, the cyclobutyl group, the cyclopentyl group, and the cyclohexyl group are preferable among the above-stated cycles A (cyclic structures) from a point of view of solubility in a solvent such as water. In particular, the cyclopentyl group and the cyclohexyl group can moderately maintain a distance between $R^1$ and $R^2$. Therefore, the effect of reducing the heat of reaction is enhanced at the time of the absorption of the acid gas, which makes it possible to obtain high acid gas absorption capacity.

The volatility of the tertiary amine compound (1) is suppressed by the cyclic structure as described above. Accordingly, it is possible for the acid gas absorbent to discharge a reduced amount of the amine component into the atmosphere in the course of processing the exhaust gas.

Examples of the cyclic structure in which the above-described alkyl groups ($R^1$ and $R^2$) are coupled to the cycle A are a 2-methylcyclopropyl group, a 2-ethylcyclopropyl group, a 2-propylcyclopropyl group, a 2-isopropylcyclopropyl group, a 2-butylcyclopropyl group, a 2-isobutylcyclopropyl group, a 2-s-butylcyclopropyl group, a 2,2-dimethylcyclopropyl group, a 2,3-dimethylcyclopropyl group, a 2,2,3-trimethylcyclopropyl group, a 2,2,4,4-tetramethylcyclopropyl group, a 2-methylcyclobutyl group, a 2-ethylcyclobutyl group, a 2-propylcyclobutyl group, a 2-isopropylcyclobutyl group, a 2-butylcyclobutyl group, a 2-isobutylcyclobutyl group, a 2-s-butylcyclobutyl group, a 2,2-dimethylcyclobutyl group, a 2,4-dimethylcyclobutyl group, a 2,2,4-trimethylcyclobutyl group, a 2,2,4,4-tetramethylcyclobutyl group, a 2-methylcyclopentyl group, a 2-ethylcyclopentyl group, a 2-propylcyclopentyl group, a 2-isopropylcyclopentyl group, a 2-butylcyclopentyl group, a 2-isobutylcyclopentyl group, a 2-s-butylcyclopentyl group, a 2,2-dimethylcyclopentyl group, a 2,5-dimethylcyclopentyl group, a 2,2,5-trimethylcyclopentyl group, a 2,2,4,4-tetramethylcyclopentyl group, a 2-methylcyclohexyl group, a 2-ethylcyclohexyl group, a 2-propylcyclohexyl group, a 2-isopropylcyclohexyl group, a 2-butylcyclohexyl group, a 2-isobutylcyclohexyl group, a 2-s-butylcyclohexyl group, a 2,2-dimethylcyclohexyl group, a 2,6-dimethylcyclohexyl group, a 2,2,6-trimethylcyclohexyl group, a 2,2,6,6-tetramethylhexyl group, a 2-methylcycloheptyl group, a 2-ethylcycloheptyl group, a 2-propylcycloheptyl group, a 2-isopropylcycloheptyl group, a 2-butylcycloheptyl group, a 2-isobutylcycloheptyl group, a 2-s-butylcycloheptyl group, a 2,2-dimethylcycloheptyl group, a 2,7-dimethylcycloheptyl group, a 2,2,7-trimethylcycloheptyl group, a 2,2,7,7-tetramethylcycloheptyl group, a 2-methylcyclooctyl group, a 2-ethylcyclooctyl group, a 2-propylcyclooctyl group, a 2-isopropylcyclooctyl group, a 2-butylcyclooctyl group, a 2-isobutylcyclooctyl group, a 2-s-butylcyclooctyl group, a 2,2-dimethylcyclooctyl group, a 2,8-dimethylcyclooctyl group, a 2,2,8-trimethylcyclooctyl group, a 2,2,8,8-tetramethylcyclooctyl group, and so on.

$R^3$ represents an alkyl group whose carbon number is 1 to 4. As $R^3$, a methyl group, an ethyl group, a propyl group, or a butyl group is usable, for instance. Among them, $R^3$ coupled to the nitrogen atom is preferably a methyl group or an ethyl group. When $R^3$ is a methyl group or an ethyl group, it is possible to reduce the heat of reaction of the tertiary amine compound (1) with the acid gas and improve the reactivity of the acid gas absorbent with carbon dioxide. $R^3$ is more preferably a methyl group.

$R^4$ is a hydroxyalkyl group. It is preferably a hydroxyalkyl group whose carbon number is 2 to 4, from a point of view of improving the reactivity with carbon dioxide. As the hydroxyalkyl group being $R^4$, a 2-hydroxyethyl group, a 3-hydroxypropyl group, a 4-hydroxybutyl group, or the like is usable, for instance. In these hydroxyalkyl groups, part of hydrogen atoms may be replaced by a methyl group or an ethyl group, so far as the carbon number does not exceed 4. Among them, the 2-hydroxyethyl group is preferable because it can provide the highest hydrophilicity and does not reduce solubility of the tertiary amine compound (1).

As the tertiary amine compound represented by the above formula (1), one in which $R^1$ and/or $R^2$ and $R^3$ are methyl groups is preferable. When at least one of the alkyl groups ($R^1$ and $R^2$) coupled to the cycle A are methyl groups and the alkyl groups coupled to the nitrogen atom is methyl groups, the heat of reaction with the acid gas such as carbon dioxide lowers and solubility in a solvent such as water is also maintained. Accordingly, it is possible to obtain excellent absorption performance for the acid gas.

Examples of the tertiary amine compound represented by the general formula (1) are
N-(2-methylcyclopropyl)-N-methylaminoethanol,
N-(2-methylcyclopropyl)-N-ethylaminoethanol,
N-(2-methylcyclopropyl)-N-propylaminoethanol,
N-(2-methylcyclopropyl)-N-butylaminoethanol,
N-(2-ethylcyclopropyl)-N-methylaminoethanol,
N-(2-ethylcyclopropyl)-N-ethylaminoethanol,
N-(2-propylcyclopropyl)-N-methylaminoethanol
N-(2-isopropylcyclopropyl)-N-methylaminoethanol,
N-(2-butylcyclopropyl)-N-methylaminoethanol,
N-(2-isobutylcyclopropyl)-N-methylaminoethanol,
N-(2-s-butylcyclopropyl)-N-methylaminoethanol,
N-(2,3-dimethylcyclopropyl)-N-methylaminoethanol,
N-(2,3-dimethylcyclopropyl)-N-methylaminoethanol,
N-(2-methyl-3-ethylcyclopropyl)-N-methylaminoethanol,
N-(2,2,3-trimethylcyclopropyl)-N-methylaminoethanol,
N-(2,2,3,3-tetramethylcyclopropyl)-N-methylaminoethanol,
N-(2-methylcyclopropyl)-N-methylaminopropanol,
N-(2-methylcyclopropyl)-N-ethylaminopropanol,
N-(2-methylcyclopropyl)-N-propylaminopropanol,
N-(2-methylcyclopropyl)-N-butylaminopropanol,
N-(2-ethylcyclopropyl)-N-methylaminopropanol,
N-(2-ethylcyclopropyl)-N-ethylaminopropanol,
N-(2-propylcyclopropyl)-N-methylaminopropanol,
N-(2-isopropylcyclopropyl)-N-methylaminopropanol,
N-(2-butylcyclopropyl)-N-methylaminopropanol,
N-(2,3-dimethylcyclopropyl)-N-methylaminopropanol,
N-(2-methylcyclopropyl)-N-methylaminobutanol,
N-(2-methylcyclopropyl)-N-ethylaminobutanol,
N-(2-methylcyclopropyl)-N-propylaminobutanol,
N-(2-methylcyclopropyl)-N-butylaminobutanol,
N-(2-ethylcyclopropyl)-N-methylaminobutanol,
N-(2-ethylcyclopropyl)-N-ethylaminobutanol,
N-(2-propylcyclopropyl)-N-methylaminobutanol,
N-(2-isopropylcyclopropyl)-N-methylaminobutanol,
N-(2-butylcyclopropyl)-N-methylaminobutanol,
N-(2,3-dimethylcyclopropyl)-N-methylaminobutanol,
N-(2-methylcyclobutyl)-N-methylaminoethanol,
N-(2-methylcyclobutyl)-N-ethylaminoethanol,
N-(2-methylcyclobutyl)-N-propylaminoethanol,
N-(2-methylcyclobutyl)-N-butylaminoethanol,
N-(2-ethylcyclobutyl)-N-methylaminoethanol,
N-(2-ethylcyclobutyl)-N-ethylaminoethanol,
N-(2-propylcyclobutyl)-N-methylaminoethanol,
N-(2-isopropylcyclobutyl)-N-methylaminoethanol,
N-(2-butylcyclobutyl)-N-methylaminoethanol,
N-(2-isobutylcyclobutyl)-N-methylaminoethanol,
N-(2-s-butylcyclobutyl)-N-methylaminoethanol,
N-(2,2-dimethylcyclobutyl)-N-methylaminoethanol,
N-(2,4-dimethylcyclobutyl)-N-methylaminoethanol,
N-(2-methyl-4-ethylcyclobutyl)-N-methylaminoethanol,
N-(2,2,4-trimethylcyclobutyl)-N-methylaminoethanol,
N-(2,2,4,4-tetramethylcyclobutyl)-N-methylaminoethanol,
N-(2-methylcyclobutyl)-N-butylaminopropanol,
N-(2-ethylcyclobutyl)-N-methylaminopropanol,
N-(2-ethylcyclobutyl)-N-ethylaminopropanol,
N-(2-propylcyclobutyl)-N-methylaminopropanol,
N-(2-isopropylcyclobutyl)-N-methylaminopropanol,
N-(2-butylcyclobutyl)-N-methylaminopropanol,
N-(2-isobutylcyclobutyl)-N-methylaminopropanol,
N-(2-s-butylcyclobutyl)-N-methylaminopropanol,
N-(2,2-dimethylcyclobutyl)-N-methylaminopropanol,
N-(2,4-dimethylcyclobutyl)-N-methylaminopropanol,
N-(2-methylcyclobutyl)-N-butylaminobutanol,
N-(2-ethylcyclobutyl)-N-methylaminobutanol,
N-(2-ethylcyclobutyl)-N-ethylaminobutanol,
N-(2-propylcyclobutyl)-N-methylaminobutanol,
N-(2-isopropylcyclobutyl)-N-methylaminobutanol,
N-(2-butylcyclobutyl)-N-methylaminobutanol,
N-(2-isobutylcyclobutyl)-N-methylaminobutanol, N-(2-s-butylcyclobutyl)-N-methylaminobutanol,
N-(2,2-dimethylcyclobutyl)-N-methylaminobutanol,
N-(2,4-dimethylcyclobutyl)-N-methylaminobutanol, and so on.

Further examples of the tertiary amine compound represented by the general formula (1) are
N-(2-methylcyclopentyl)-N-methylaminoethanol,
N-(2-methylcyclopentyl)-N-ethylaminoethanol,
N-(2-methylcyclopentyl)-N-propylaminoethanol,
N-(2-methylcyclopentyl)-N-butylaminoethanol,
N-(2-ethylcyclopentyl)-N-methylaminoethanol,
N-(2-ethylcyclopentyl)-N-ethylaminoethanol,
N-(2-propylcyclopentyl)-N-methylaminoethanol,
N-(2-isopropylcyclopentyl)-N-methylaminoethanol,
N-(2-butylcyclopentyl)-N-methylaminoethanol,
N-(2-isobutylcyclopentyl)-N-methylaminoethanol,
N-(2-s-butylcyclopentyl)-N-methylaminoethanol,
N-(2,2-dimethylcyclopentyl)-N-methylaminoethanol,
N-(2,5-dimethylcyclopentyl)-N-methylaminoethanol,
N-(2-methyl-5-ethylcyclopentyl)-N-methylaminoethanol,
N-(2,2,5-trimethylcyclopentyl)-N-methylaminoethanol,
N-(2,2,5,5-tetramethylcyclopentyl)-N-methylaminoethanol,
N-(2-methylcyclopentyl)-N-methylaminopropanol,
N-(2-methylcyclopentyl)-N-ethylaminopropanol,
N-(2-methylcyclopentyl)-N-propylaminopropanol,
N-(2-methylcyclopentyl)-N-butylaminopropanol,
N-(2-ethylcyclopentyl)-N-methylaminopropanol,
N-(2-ethylcyclopentyl)-N-ethylaminopropanol,
N-(2-propylcyclopentyl)-N-methylaminopropanol,
N-(2-isopropylcyclopentyl)-N-methylaminopropanol,
N-(2-butylcyclopentyl)-N-methylaminopropanol,
N-(2-isobutylcyclopentyl)-N-methylaminopropanol,
N-(2-s-butylcyclopentyl)-N-methylaminopropanol,
N-(2,2-dimethylcyclopentyl)-N-methylaminopropanol,
N-(2,5-dimethylcyclopentyl)-N-methylaminopropanol,
N-(2-methylcyclopentyl)-N-methylaminobutanol,
N-(2-methylcyclopentyl)-N-ethylaminobutanol,
N-(2-methylcyclopentyl)-N-propylaminobutanol,
N-(2-methylcyclopentyl)-N-butylaminobutanol,
N-(2-ethylcyclopentyl)-N-methylaminobutanol,
N-(2-ethylcyclopentyl)-N-ethylaminobutanol,
N-(2-propylcyclopentyl)-N-methylaminobutanol,
N-(2-isopropylcyclopentyl)-N-methylaminobutanol,
N-(2-butylcyclopentyl)-N-methylaminobutanol,
N-(2-isobutylcyclopentyl)-N-methylaminobutanol,
N-(2-s-butylcyclopentyl)-N-methylaminobutanol,
N-(2,2-dimethylcyclopentyl)-N-methylaminobutanol,
N-(2,5-dimethylcyclopentyl)-N-methylaminobutanol,
N-(2-methylcyclohexyl)-N-methylaminoethanol,
N-(2-methylcyclohexyl)-N-ethylaminoethanol,
N-(2-methylcyclohexyl)-N-propylaminoethanol,
N-(2-methylcyclohexyl)-N-butylaminoethanol,
N-(2-ethylcyclohexyl)-N-methylaminoethanol,
N-(2-ethylcyclohexyl)-N-ethylaminoethanol,
N-(2-propylcyclohexyl)-N-methylaminoethanol,
N-(2-isopropylcyclohexyl)-N-methylaminoethanol,
N-(2-butylcyclohexyl)-N-methylaminoethanol,
N-(2-isobutylcyclohexyl)-N-methylaminoethanol,
N-(2-s-butylcyclohexyl)-N-methylaminoethanol,
N-(2,2-dimethylcyclohexyl)-N-methylaminoethanol,
N-(2,6-dimethylcyclohexyl)-N-methylaminoethanol,
N-(2-methyl-6-ethylcyclohexyl)-N-methylaminoethanol,
N-(2,2,6-trimethylcyclohexyl)-N-methylaminoethanol,
N-(2,2,6,6-tetramethylcyclohexyl)-N-methylaminoethanol,
N-(2-methylcyclohexyl)-N-methylaminopropanol,
N-(2-methylcyclohexyl)-N-ethylaminopropanol,
N-(2-methylcyclohexyl)-N-propylaminopropanol,
N-(2-methylcyclohexyl)-N-butylaminopropanol,
N-(2-ethylcyclohexyl)-N-methylaminopropanol,
N-(2-ethylcyclohexyl)-N-ethylaminopropanol,
N-(2-propylcyclohexyl)-N-methylaminopropanol,
N-(2-isopropylcyclohexyl)-N-methylaminopropanol,
N-(2-butylcyclohexyl)-N-methylaminopropanol,
N-(2-isobutylcyclohexyl)-N-methylaminopropanol,
N-(2-s-butylcyclohexyl)-N-methylaminopropanol,
N-(2,2-dimethylcyclohexyl)-N-methylaminopropanol,
N-(2,6-dimethylcyclohexyl)-N-methylaminopropanol,
N-(2-methylcyclohexyl)-N-methylaminobutanol,
N-(2-methylcyclohexyl)-N-ethylaminobutanol,
N-(2-methylcyclohexyl)-N-propylaminobutanol,
N-(2-methylcyclohexyl)-N-butylaminobutanol,
N-(2-ethylcyclohexyl)-N-methylaminobutanol,
N-(2-ethylcyclohexyl)-N-ethylaminobutanol,
N-(2-propylcyclohexyl)-N-methylaminobutanol,
N-(2-isopropylcyclohexyl)-N-methylaminobutanol,
N-(2-butylcyclohexyl)-N-methylaminobutanol,
N-(2-isobutylcyclohexyl)-N-methylaminobutanol,
N-(2-s-butylcyclohexyl)-N-methylaminobutanol,
N-(2,2-dimethylcyclohexyl)-N-methylaminobutanol,
N-(2,6-dimethylcyclohexyl)-N-methylaminobutanol, and so on.

Further examples of the tertiary amine compound represented by the general formula (1) are
N-(2-methylcycloheptyl)-N-methylaminoethanol,
N-(2-methylcycloheptyl)-N-ethylaminoethanol,
N-(2-methylcycloheptyl)-N-propylaminoethanol,
N-(2-methylcycloheptyl)-N-butylaminoethanol,
N-(2-ethylcycloheptyl)-N-methylaminoethanol,
N-(2-ethylcycloheptyl)-N-ethylaminoethanol,
N-(2-propylcycloheptyl)-N-methylaminoethanol,
N-(2-isopropylcycloheptyl)-N-methylaminoethanol,
N-(2-butylcycloheptyl)-N-methylaminoethanol,
N-(2-isobutylcycloheptyl)-N-methylaminoethanol,
N-(2-s-butylcycloheptyl)-N-methylaminoethanol,
N-(2,2-dimethylcycloheptyl)-N-methylaminoethanol,
N-(2,7-dimethylcycloheptyl)-N-methylaminoethanol,
N-(2-methyl-7-ethylcycloheptyl)-N-methylaminoethanol,
N-(2,2,7-trimethylcycloheptyl)-N-methylaminoethanol,
N-(2,2,7,7-tetramethylcycloheptyl)-N-methylaminoethanol,
N-(2-methylcycloheptyl)-N-methylaminopropanol,
N-(2-methylcycloheptyl)-N-ethylaminopropanol,
N-(2-methylcycloheptyl)-N-propylaminopropanol,
N-(2-methylcycloheptyl)-N-butylaminopropanol,
N-(2-ethylcycloheptyl)-N-methylaminopropanol,
N-(2-ethylcycloheptyl)-N-ethylaminopropanol,
N-(2-propylcycloheptyl)-N-methylaminopropanol,
N-(2-isopropylcycloheptyl)-N-methylaminopropanol,
N-(2-butylcycloheptyl)-N-methylaminopropanol,
N-(2-isobutylcycloheptyl)-N-methylaminopropanol,
N-(2-s-butylcycloheptyl)-N-methylaminopropanol,
N-(2,2-dimethylcycloheptyl)-N-methylaminopropanol,
N-(2,7-dimethylcycloheptyl)-N-methylaminopropanol,
N-(2-methylcycloheptyl)-N-methylaminobutanol,
N-(2-methylcycloheptyl)-N-ethylaminobutanol,
N-(2-methylcycloheptyl)-N-propylaminobutanol,
N-(2-methylcycloheptyl)-N-butylaminobutanol,
N-(2-ethylcycloheptyl)-N-methylaminobutanol,
N-(2-ethylcycloheptyl)-N-ethylaminobutanol,
N-(2-propylcycloheptyl)-N-methylaminobutanol,
N-(2-isopropylcycloheptyl)-N-methylaminobutanol,
N-(2-butylcycloheptyl)-N-methylaminobutanol,
N-(2-isobutylcycloheptyl)-N-methylaminobutanol,
N-(2-s-butylcycloheptyl)-N-methylaminobutanol,
N-(2,2-dimethylcycloheptyl)-N-methylaminobutanol, N-(2,7-dimethylcycloheptyl)-N-methylaminobutanol,
N-(2-methylcyclooctyl)-N-methylaminoethanol,
N-(2-methylcyclooctyl)-N-ethylaminoethanol,
N-(2-methylcyclooctyl)-N-propylaminoethanol,
N-(2-methylcyclooctyl)-N-butylaminoethanol,
N-(2-ethylcyclooctyl)-N-methylaminoethanol,
N-(2-ethylcyclooctyl)-N-ethylaminoethanol,
N-(2-propylcyclooctyl)-N-methylaminoethanol,
N-(2-isopropylcyclooctyl)-N-methylaminoethanol,
N-(2-butylcyclooctyl)-N-methylaminoethanol,
N-(2-isobutylcyclooctyl)-N-methylaminoethanol,
N-(2-s-butylcyclooctyl)-N-methylaminoethanol,
N-(2,2-dimethylcyclooctyl)-N-methylaminoethanol,
N-(2,8-dimethylcyclooctyl)-N-methylaminoethanol,
N-(2-methyl-8-ethylcyclooctyl)-N-methylaminoethanol,
N-(2,2,8-trimethylcyclooctyl)-N-methylaminoethanol,
N-(2,2,8,8-tetramethylcyclooctyl)-N-methylaminoethanol,
N-(2-methylcyclooctyl)-N-methylaminopropanol,
N-(2-methylcyclooctyl)-N-ethylaminopropanol,
N-(2-methylcyclooctyl)-N-propylaminopropanol,
N-(2-methylcyclooctyl)-N-butylaminopropanol,
N-(2-ethylcyclooctyl)-N-methylaminopropanol,
N-(2-ethylcyclooctyl)-N-ethylaminopropanol,
N-(2-propylcyclooctyl)-N-methylaminopropanol,
N-(2-isopropylcyclooctyl)-N-methylaminopropanol,
N-(2-butylcyclooctyl)-N-methylaminopropanol,
N-(2-isobutylcyclooctyl)-N-methylaminopropanol,
N-(2-s-butylcyclooctyl)-N-methylaminopropanol,
N-(2,2-dimethylcyclooctyl)-N-methylaminopropanol,
N-(2,8-dimethylcyclooctyl)-N-methylaminopropanol,
N-(2-methylcyclooctyl)-N-methylaminobutanol,
N-(2-methylcyclooctyl)-N-ethylaminobutanol,
N-(2-methylcyclooctyl)-N-propylaminobutanol,
N-(2-methylcyclooctyl)-N-butylaminobutanol,
N-(2-ethylcyclooctyl)-N-methylaminobutanol,
N-(2-ethylcyclooctyl)-N-ethylaminobutanol,
N-(2-propylcyclooctyl)-N-methylaminobutanol,
N-(2-isopropylcyclooctyl)-N-methylaminobutanol,
N-(2-butylcyclooctyl)-N-methylaminobutanol,
N-(2-isobutylcyclooctyl)-N-methylaminobutanol,
N-(2-s-butylcyclooctyl)-N-methylaminobutanol,
N-(2,2-dimethylcyclooctyl)-N-methylaminobutanol,
N-(2,8-dimethylcyclooctyl)-N-methylaminobutanol, and so on.

Note that one type of compound selected from the above-stated groups can be used as the tertiary amine compound (1). One in which two or more types of compounds selected from the above-stated groups are mixed can be used as the tertiary amine compound (1).

It is preferable that a content of the tertiary amine compound (1) contained in the acid gas absorbent is 15 mass % to 55 mass %. In general, an absorption amount and a desorption amount of carbon dioxide per unit capacity are larger and an absorption speed and a desorption speed of carbon dioxide are faster as a concentration of the amine component is higher, and therefore, this is preferable in view of energy consumption, a size of a plant facility, and process efficiency. However, it becomes impossible for the water contained in the absorbing liquid to fully exhibit a function as an activator for the absorption of carbon dioxide when the concentration of the amine component in the absorbing liquid is too high. Besides, defects such as an increase of viscosity of the absorbing liquid become not negligible when the concentration of the amine component in the absorbing liquid is too high. When the content of the tertiary amine compound (1) is 50 mass % or less, phenomena such as the increase of the viscosity of the absorbing liquid and the deterioration of the function of water as the activator are not recognized. Besides, by setting the content of the tertiary amine compound (1) to 15 mass % or more, it is possible to obtain sufficient absorption amount and absorption speed of carbon dioxide, and to obtain excellent process efficiency.

When the acid gas absorbent in which the content of the tertiary amine compound (1) is within a range of 15 mass % to 55 mass % is used for recovery of carbon dioxide, not only the absorption amount of carbon dioxide and the absorption speed of carbon dioxide are high but also the desorption amount of carbon dioxide and the desorption speed of carbon dioxide are high. Accordingly, it is advantageous in that the recovery of carbon dioxide can be performed efficiently. The content of the tertiary amine compound (1) is more preferably 20 mass % to 50 mass %.

It is preferable that the tertiary amine compound (1) is used while being mixed with a reaction accelerator composed of alkanolamines and/or a hetero cyclic amine compound represented by the following general formula (2) (hereinafter, referred to as the hetero cyclic amine compound (2)).

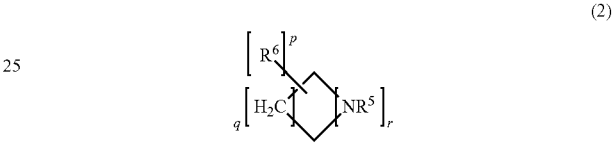

(2)

In the formula (2), $R^5$ represents a hydrogen atom or an alkyl group whose carbon number is 1 to 4. $R^6$ represents an alkyl group whose carbon number is 1 to 4 and which is coupled to a carbon atom. "r" represents an integer number of 1 to 3, "q" represents an integer number of 1 to 4, and "p" represents an integer number of "0" (zero) to 12. When "r" is 2 to 3, the nitrogen atoms are not directly coupled with each other. Part of hydrogen atoms of the alkyl group having the carbon number of 1 to 4, that is, of $R^5$ and part of hydrogen atoms of the alkyl group having the carbon number of 1 to 4, that is, of $R^6$, may be replaced by a hydroxyl group or an amino group respectively.

In the present embodiment, it is possible to mix, for example, the tertiary amine compound (1) and the reaction accelerator composed of the alkanolamines and/or the hetero cyclic amine compound (2). In addition, as the acid gas absorbent, it is possible to use the one in which the mixture of the tertiary amine compound (1) and the alkanolamines and/or the hetero cyclic amine compound (2) is made into, for example, a water solution. By using the tertiary amine compound (1) mixed with the alkanolamines and/or the hetero cyclic amine compound (2), it is possible to further improve the absorption amount of carbon dioxide per unit mol of the tertiary amine compound (1), the absorption amount of carbon dioxide per unit volume of the acid gas absorbent and the absorption speed of carbon dioxide. Besides, the use of the tertiary amine compound (1) mixed with the alkanolamines and/or the hetero cyclic amine compound (2) lowers an energy separating the acid gas after the absorption of carbon dioxide (acid gas desorption energy), and also makes it possible to reduce the energy when the acid gas absorbent is regenerated.

For example, monoethanolamine, 2-amino-2-methylpropanolamine, 2-amino-2-methyl-1,3-dipropanolamine, methylaminoethanol, ethylaminoethanol, propylaminoethanol, diethanolamine, bis(2-hydroxy-1-methylethyl)amine, methyldiethanolamine, dimethylethanolamine, diethylethanolamine, triethanolamine, dimethylamino-1-methylethanol, 2-methylaminoethanol, 2-ethylaminoethanol, 2-propylaminoethanol, n-butylaminoethanol, 2-(isopropylamino)ethanol, 3-ethylaminopropanol, triethanolamine, diethanolamine, and so on can be cited as alkanolamine.

Among them, alkanolamines is preferably at least one type selected from a group consisting of 2-(isopropylamino) ethanol, 2-(ethylamino)ethanol, and 2-amino-2-methyl-1-propanol, from a point of view of improving the reactivity between the tertiary amine and the acid gas.

As the hetero cyclic amine compound (2), azetidine, 1-methylazetidine, 1-ethylazetidine, 2-methylazetidine, 2-azetidinemethanol, 2-(2-aminoethyl)azetidine, pyrrolidine, 1-methylpyrrolidine, 2-methylpyrrolidine, 2-butylpyrrolidine, 2-pyrrolidinemethanol, 2-(2-aminoethyl)pyrrolidine, piperidine, 1-methylpiperidine, 2-ethylpiperidine, 3-propylpiperidine, 4-ethylpiperidine, 2-piperidinemethanol, 3-piperidineethanol, 2-(2-aminoethyl)pyrrolidine, hexahydro-1H-azepine, hexamethylenetetramine, piperazine, piperazine derivatives, and so on can be cited.

Among them, the piperazine derivative is particularly desirable from points of view of improvements of the carbon dioxide absorption amount and absorption speed of the acid gas absorbent. The piperazine derivative is a secondary amine compound, and in general, a nitrogen atom of the secondary amino group is coupled to carbon dioxide to form carbamate ion, and thereby, it contributes to the improvement of the absorption speed at an initial stage of the reaction. Further, the nitrogen atom of the secondary amino group has a role of converting carbon dioxide coupled thereto into bicarbonate ($HCO_3^-$), and contributes to the improvement of speed at a half stage after the reaction.

The piperazine derivative is more preferably at least one type from among 2-methylpiperazine, 2,5-dimethylpiperazine, 2,6-dimethylpiperazine, 1-methylpiperazine, 1-(2-hydroxyethyl) piperazine, and 1-(2-aminoethyl) piperazine.

It is preferable that the content of the reaction accelerator (the alkanolamines and/or the hetero cyclic amine compound (2)) contained in the acid gas absorbent is 1 mass % to 15 mass %. There is a possibility that the effect of improving the absorption speed of carbon dioxide cannot be fully obtained when the content of the reaction accelerator contained in the acid gas absorbent is less than 1 mass %. When the content of the reaction accelerator contained in the acid gas absorbent exceeds 15 mass %, there is a possibility that the reactivity conversely deteriorates because the viscosity of the absorbent becomes excessively high.

The acid gas absorbent may contain an anticorrosive of a phosphoric acid based material or the like to prevent a corrosion of the plant equipment, a defoamer of a silicone based material and so on to prevent effervescence, an antioxidant to prevent deterioration of the acid gas absorbent, and so on, in addition to the amine compound and the reaction accelerator as stated above.

An acid gas removal method according to the present embodiment is the one in which exhaust gas containing acid gas is brought into contact with an acid gas absorbent made up by dissolving the amine compound described in the above-stated embodiment in a solvent, and the acid gas is absorbed and separated to be removed from the exhaust gas containing the acid gas.

A basic constitution of an absorbing and separating process of carbon dioxide includes: a process bringing exhaust gas containing carbon dioxide into contact with an acid gas absorbent to make the acid gas absorbent absorb the carbon dioxide (carbon dioxide absorbing process); and a process heating the acid gas absorbent by which the carbon dioxide is absorbed, that is obtained at the carbon dioxide absorbing process, to desorb and recover the carbon dioxide (carbon dioxide separating process).

A method to bring the gas containing the carbon dioxide into contact with a water solution containing the acid gas absorbent is not particularly limited, but for example, this process is performed by a method in which the gas containing the carbon dioxide is bubbled in the acid gas absorbent, whereby the carbon dioxide is absorbed, a method in which the acid gas absorbent is atomized and sprayed in a flow of the gas containing the carbon dioxide (atomizing and spraying method), a method in which the gas containing the carbon dioxide is brought into countercurrent contact with the acid gas absorbent in an absorption tower containing a filler made of a porcelain or a filler made of a metal net, or the like.

A temperature of the acid gas absorbent when the gas containing the carbon dioxide is absorbed in the water solution is generally set within a range from a room temperature to 60° C. or less. The temperature is preferably 50° C. or less, and more preferably approximately 20° C. to 45° C. The absorption amount of the acid gas increases as the temperature is lower, but a lower limit value of the process temperature is determined by a gas temperature, a heat recovery target and so on in the process. A pressure at the carbon dioxide absorption time is generally approximately the atmospheric pressure. It is possible to pressurize up to higher pressure to enhance the absorption performance, but in order to suppress energy consumption required for compression, it is preferable to set under the atmospheric pressure.

In the carbon dioxide absorption process, the carbon dioxide absorption amount at the carbon dioxide absorption time (40° C.) of the acid gas absorbent containing 15 mass % to 50 mass % of the amine compound according to the above-stated embodiment is approximately 0.30 mol to 0.62 mol per 1 mol of amine contained in the absorbent. Besides, in the carbon dioxide absorption process, the carbon dioxide absorption speed of the acid gas absorbent containing 10 mass % to 55 mass % of the amine compound according to the embodiment after a few minutes have passed since the absorption of carbon dioxide is started is approximately 0.32 mol/L/min to 0.38 mol/L/min.

Here, a carbon dioxide saturation absorption amount is a value of an inorganic carbon amount measured in the acid gas absorbent by an infrared gas concentration measurement device. Besides, the carbon dioxide absorption speed is a value measured by using an infrared carbon dioxide sensor at a time when a few minutes have passed since the absorption of the carbon dioxide is started.

Examples of a method separating the carbon dioxide from the acid gas absorbent by which the carbon dioxide is absorbed, and recovering pure or high-concentration carbon dioxide are a method desorbing the carbon dioxide by heating the acid gas absorbent and beating it in an iron pot as in distillation, a method spreading a liquid interface in a plate tower, a spray tower, and the regeneration tower containing a filler made of a porcelain or a filler made of a metal net, followed by heating, and so on. The carbon dioxide is thereby released and discharged from anionic carbamate and bicarbonate.

A temperature of the acid gas absorbent at the carbon dioxide separation time is normally set to 70° C. or more. The temperature of the acid gas absorbent at the carbon dioxide separation time is preferably 80° C. or more, and more preferably approximately 90° C. to 120° C. The desorption amount increases as the temperature is higher, but the energy required for the heating of the absorbing liquid increases if the temperature is increased. Accordingly, the temperature of the acid gas absorbent at the carbon dioxide separation time is determined by the gas temperature, the heat recovery target and so on in the process. The pressure at the carbon dioxide desorption time is generally approximately the atmospheric pressure. It is possible to decrease the pressure to a lower pressure to enhance the desorption performance, but in order to suppress energy consumption required to decrease the pressure, the pressure is preferably the atmospheric pressure.

The carbon dioxide desorption amount at the carbon dioxide desorption time (70° C.) of the water solution containing 15 mass % to 55 mass % of the amine compound according to the above-stated embodiment is approximately 0.23 mol to 0.47 mol per 1 mol of amine contained in the absorbent.

The acid gas absorbent after the carbon dioxide is separated is transferred to the carbon dioxide absorption process again to be cyclically used (recycled). Besides, the heat generated at the carbon dioxide absorption time is generally heat exchanged by a heat exchanger for preheating the water solution injected into the regeneration tower during a recycle process of the water solution, and is cooled.

Purity of the carbon dioxide recovered as stated above is normally extremely high such as approximately 95 vol % to 99 vol %. This pure carbon dioxide or high-concentration carbon dioxide is used as chemicals, synthetic raw materials of high polymer, a coolant for freezing foods, and so on. In addition, it is possible to isolate and store the recovered carbon dioxide to an underground or the like by means which is currently technically developed.

The process separating the carbon dioxide from the acid gas absorbent and regenerating the acid gas absorbent, out of the aforesaid processes, is a part consuming the largest amount of energy, and this process consumes approximately 50% to 80% of the energy consumed in all the processes. Accordingly, by reducing the consumption energy at the regeneration process of the acid gas absorbent, it is possible to reduce a cost of the carbon dioxide absorbing and separating process. Accordingly, it is possible to remove the acid gas from the exhaust gas advantageously from an economical viewpoint.

According to the present embodiment, it is possible to reduce the energy required for the desorption of the carbon dioxide (regeneration process) by using the acid gas absorbent according to the above-stated embodiment. Accordingly, it is possible to perform the absorbing and separating process of the carbon dioxide under an economically advantageous condition.

Besides, the amine compound according to the embodiment is extremely highly anticorrosive to a metal material such as a carbon steel, compared to alkanolamines such as 2-aminoethanol which has been conventionally used as the acid gas absorbent. Accordingly, it is cost-advantageous to use the acid gas removal method using the acid gas absorbent as stated above because it is not necessary to use expensive corrosion-resistant steel in, for example, a plant construction.

An acid gas removal device according to the present embodiment includes: an absorption tower bringing gas containing acid gas into contact with the acid gas absorbent according to the embodiment to remove the acid gas from the gas; and a regeneration tower removing the acid gas from the acid gas absorbent absorbing the acid gas to regenerate the acid gas absorbent that is to be reused at the absorption tower.

FIG. 1 is a schematic diagram of an acid gas removal device according to an embodiment. This acid gas removal device 1 includes: an absorption tower 2 bringing gas containing acid gas (hereinafter, referred to as exhaust gas) into contact with an acid gas absorbent to absorb and remove the acid gas from the exhaust gas; and a regeneration tower 3 separating the acid gas from the acid gas absorbent absorbing the acid gas to regenerate the acid gas absorbent. Hereinafter, a case when the acid gas is carbon dioxide will be described as an example.

As illustrated in FIG. 1, exhaust gas containing carbon dioxide, such as exhaust combustion gas discharged from a thermal power station is introduced to a lower part of the absorption tower 2 through a gas supply port 4. This exhaust gas is shut in the absorption tower 2, and it is brought into contact with an acid gas absorbent supplied from an acid gas absorbent supply port 5 at an upper part of the absorption tower 2. The acid gas absorbent according to the above-stated embodiment is used as the acid gas absorbent.

A pH value of the acid gas absorbent may be adjusted to at least 9 or more. An optimum condition of the pH value of the acid gas absorbent may be appropriately selected depending on a kind or a concentration of harmful gas contained in the exhaust gas, a flow rate, and so on.

Besides, the acid gas absorbent may contain other compounds such as a nitrogen-containing compound improving carbon dioxide absorption performance, an antioxidant, a pH adjusting agent in an arbitrary ratio, in addition to the amine based compound and the solvent such as water which are described above.

As stated above, the exhaust gas is brought into contact with the acid gas absorbent, and thereby, the carbon dioxide in the exhaust gas is absorbed by the acid gas absorbent and removed. The exhaust gas after the carbon dioxide is removed is discharged to the outside of the absorption tower 2 from a gas discharge port 6.

The acid gas absorbent absorbing the carbon dioxide is transferred to a heat exchanger 7 and a heater 8 to be heated, and thereafter, transferred to the regeneration tower 3. The acid gas absorbent transferred into the regeneration tower 3 is moved from an upper part to a lower part of the regeneration tower 3. The carbon dioxide in the acid gas absorbent is desorbed during the moving, and the acid gas absorbent is regenerated.

The acid gas absorbent regenerated in the regeneration tower 3 is transferred to the heat exchanger 7 and an absorbing liquid cooler 10 by a pump 9, and returned to the absorption tower 2 from the acid gas absorbent supply port 5.

On the other hand, the carbon dioxide separated from the acid gas absorbent is brought into contact with reflux water supplied from a reflux drum 11 at the upper part of the regeneration tower 3, and discharged to the outside of the regeneration tower 3. The reflux water in which the carbon dioxide is dissolved is cooled in a reflux condenser 12, and thereafter, in the reflux drum 11, it is separated from a liquid component in which vapor with the carbon dioxide is condensed. This liquid component is introduced to the carbon dioxide recovery process by a recovery carbon dioxide line 13. On the other hand, the reflux water from which the carbon dioxide is separated is transferred to the regeneration tower 3 by a reflux water pump 14.

According to the acid gas removal device 1 of the present embodiment, it becomes possible to absorb and remove carbon dioxide highly efficiently by using the acid gas absorbent excellent in carbon dioxide absorption feature and desorption feature.

Hereinabove, the embodiments of the present invention are described with reference to the concrete examples, but the above-stated examples are presented only as examples of the present invention, and do not to intend to limit the invention. Besides, the description of the embodiments does not give a description relating to portions and so on which are not directly necessary for the explanation of the present invention, in the acid gas absorbent, the acid gas removal device, and the acid gas removal method. However, required elements among them may be appropriately selected to be used.

In addition, acid gas absorbents, acid gas removal devices, and acid gas removal methods that include the elements of the present invention and that a person skilled in the art could achieve by appropriately making design changes without departing from the spirit or essential characteristics thereof are all embraced in the range of the present invention. The range of the present invention is defined by a range of the claims and a range of equivalents thereof.

EXAMPLES

Hereinafter, the present invention will be described in more detail with reference to examples and a comparative example, but the present invention is not limited to these examples.

Example 1

A water solution of 50 ml (hereinafter, referred to as an absorbing liquid) was prepared by dissolving 45 mass % of N-(2-methylcyclopropyl)-N-methylaminoethanol and 5 mass % of piperidine in water. This absorbing liquid was filled in a test tube and heated to 40° C., then mixed gas containing 10 vol % carbon dioxide ($CO_2$) and 90 vol % nitrogen ($N_2$) gas was aerated at a flow rate of 500 mL/min. Absorption performance was evaluated by measuring the carbon dioxide ($CO_2$) concentration in the gas at an exit of the test tube by using an infrared gas concentration measurement device (manufactured by Shimadzu Corporation, name of article: "CGT-700"). A Teflon (registered trademark) tube (inside diameter: 1.59 mm, outside diameter: 3.17 mm) of ⅛ inches was set at a gas introducing port to the amine solution in the test tube.

Besides, the water solution after the mixed gas was absorbed at 40° C. as stated above was heated to 80° C., 100% nitrogen ($N_2$) gas was aerated at a flow rate of 500 mL/min, and the $CO_2$ concentration in the absorbing liquid was measured by using the infrared gas concentration measurement device to evaluate release performance.

The carbon dioxide absorption speed of the absorbing liquid was the speed measured at a time after two minutes have passed since the absorption of carbon dioxide was started.

A carbon dioxide absorption amount of the absorbing liquid at 40° C. was 0.44 mol per 1 mol of an amino compound in the absorbing liquid. A carbon dioxide ($CO_2$) absorption amount of the absorbing liquid at 80° C. was 0.08 mol per 1 mol of the amino compound. In a process of absorbing the carbon dioxide ($CO_2$) at 40° C. and desorbing the carbon dioxide ($CO_2$) at 80° C., 0.36 mol $CO_2$ was recovered per 1 mol of the amino compound. A $CO_2$ absorption speed was 0.037 mol/L/min.

Heat of reaction was measured as follows. A differential reaction calorimeter "DRC" (product name, manufactured by SETRAM company) composed of a glass reaction vessel and a reference vessel with the same shape installed in a thermostatic oven was used to measure the heat of reaction of the carbon dioxide absorption by the absorbing liquid. The reaction vessel and the reference vessel were each filled with a 150 mL absorbing liquid, and 40° C. constant-temperature water was circulated in jacket portions of the vessels. In this state, carbon dioxide gas with a 100% concentration was blown to the absorbing liquid in the reaction vessel at 200 ml/min, a temperature increase of the liquid was continuously recorded by a thermograph until the carbon dioxide absorption was finished, and the heat of reaction was calculated by using an overall heat transfer coefficient between the reaction vessel and the jacket water which was measured in advance. The heat of reaction of the carbon dioxide absorption was 60 kJ/mol-$CO_2$.

Example 2

An absorbing liquid (water solution) was prepared in the same manner as in the example 1 except that N-(2-methylcyclobutyl)-N-methylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.43 mol and the absorption amount of carbon dioxide at 80° C. was 0.07 mol, per 1 mol of an amino compound in the absorbing liquid. 0.36 mol carbon dioxide was recovered per 1 mol of the amino compound in the absorbing liquid. The absorption speed of $CO_2$ was 0.036 mol/L/min. The heat of reaction of the carbon dioxide absorption was 62 kJ/mol-$CO_2$.

Example 3

An absorbing liquid (water solution) was prepared in the same manner as in the Example 1 except that N-(2-methylcyclopentyl)-N-methylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1.

The absorption amount of carbon dioxide at 40° C. was 0.45 mol and the absorption amount of carbon dioxide at 80° C. was 0.05 mol, per 1 mol of an amino compound in the absorbing liquid. 0.40 mol carbon dioxide was recovered per 1 mol of the amino compound in the absorbing liquid. The absorption speed of $CO_2$ was 0.035 mol/L/min. The heat of reaction of the carbon dioxide absorption was 60 kJ/mol-$CO_2$.

Example 4

An absorbing liquid (water solution) was prepared in the same manner as in the Example 1 except that N-(2-methylcyclohexyl)-N-methylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.43 mol and the absorption amount of carbon dioxide at 80° C. was 0.05 mol, per 1 mol of an amino compound in the absorbing liquid. 0.38 mol carbon dioxide was recovered per 1 mol of the amino compound in the absorbing liquid. The absorption speed of $CO_2$ was 0.033 mol/L/min. The heat of reaction of the carbon dioxide absorption was 61 kJ/mol-$CO_2$.

Example 5

An absorbing liquid (water solution) was prepared in the same manner as in the Example 1 except that N-(2,5-dimethylcyclopentyl)-N-methylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.42 mol and the absorption amount of carbon dioxide at 80° C. was 0.05 mol, per 1 mol of an amino compound in the absorbing liquid. 0.37 mol carbon dioxide was recovered per 1 mol of the amino compound in the absorbing liquid. The absorption speed of $CO_2$ was 0.036 mol/L/min. The heat of reaction of the carbon dioxide absorption was 59 kJ/mol-$CO_2$.

Example 6

An absorbing liquid (water solution) was prepared in the same manner as in the Example 1 except that N-(2-methylcyclopentyl)-N-ethylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.43 mol and the absorption amount of carbon dioxide at 80° C. was 0.05 mol, per 1 mol of an amino compound in the absorbing liquid. 0.38 mol carbon dioxide was recovered per 1 mol of the amino compound in the absorbing liquid. The absorption speed of $CO_2$ was 0.033 mol/L/min. The heat of reaction of the carbon dioxide absorption was 59 kJ/mol-$CO_2$.

Example 7

An absorbing liquid (water solution) was prepared in the same manner as in the example 1 except that N-(2-methylcyclohexyl)-N-ethylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.41 mol and the absorption amount of carbon dioxide at 80° C. was 0.04 mol, per 1 mol of an amino compound in the absorbing liquid. 0.37 mol carbon dioxide was recovered per 1 mol of the amino compound in the absorbing liquid. The absorption speed of $CO_2$ was 0.031 mol/L/min. The heat of reaction of the carbon dioxide absorption was 60 kJ/mol-$CO_2$.

Example 8

An absorbing liquid (water solution) was prepared in the same manner as in the Example 1 except that N-(2-methylcyclopentyl)-N-propylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.42 mol and the absorption amount of carbon dioxide at 80° C. was 0.05 mol, per 1 mol of an amino compound in the absorbing liquid. 0.37 mol carbon dioxide was recovered per 1 mol of the amino compound in the absorbing liquid. The absorption speed of $CO_2$ was 0.032 mol/L/min. The heat of reaction of the carbon dioxide absorption was 59 kJ/mol-$CO_2$.

Example 9

An absorbing liquid (water solution) was prepared in the same manner as in the Example 1 except that N-(2-methylcyclopentyl)-N-butylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.41 mol and the absorption amount of carbon dioxide at 80° C. was 0.04 mol, per 1 mol of an amino compound in the absorbing liquid. 0.37 mol carbon dioxide was recovered per 1 mol of the amino compound in the absorbing liquid. The absorption speed of $CO_2$ was 0.031 mol/L/min. The heat of reaction of the carbon dioxide absorption was 59 kJ/mol-$CO_2$.

Example 10

An absorbing liquid (water solution) was prepared in the same manner as in the Example 1 except that N-(2-methylcyclopentyl)-N-methylaminopropanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.42 mol and the absorption amount of carbon dioxide at 80° C. was 0.05 mol, per 1 mol of an amino compound in the absorbing liquid. 0.37 mol carbon dioxide was recovered per 1 mol of the amino compound in the absorbing liquid. The absorption speed of $CO_2$ was 0.032 mol/L/min. The heat of reaction of the carbon dioxide absorption was 59 kJ/mol-$CO_2$.

Example 11

An absorbing liquid (water solution) was prepared in the same manner as in the Example 1 except that N-(2-methylcyclopentyl)-N-methylaminobutanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.40 mol and the absorption amount of carbon dioxide at 80° C. was 0.04 mol, per 1 mol of an amino compound in the absorbing liquid. 0.36 mol carbon dioxide was recovered per 1 mol of the amino compound in the absorbing liquid. The absorption speed of $CO_2$ was 0.031 mol/L/min. The heat of reaction of the carbon dioxide absorption was 61 kJ/mol-$CO_2$.

Example 12

An absorbing liquid (water solution) was prepared in the same manner as in the Example 1 except that N-(2-methylcyclopentyl)-N-methylaminoethanol was used instead of N-(2-methylcyclopropyl)-N-methylaminoethanol and 2-methylpiperazine was used instead of piperazine. An absorption amount of carbon dioxide, an absorption speed of carbon dioxide, and heat of reaction were measured under the same conditions by using the same devices as those of the Example 1. The absorption amount of carbon dioxide at 40° C. was 0.38 mol and the absorption amount of carbon dioxide at 80° C. was 0.06 mol, per 1 mol of an amino compound in the absorbing liquid. 0.32 mol carbon dioxide was recovered per 1 mol of the amino compound in the absorbing liquid. The absorption speed of $CO_2$ was 0.031 mol/L/min. The heat of reaction of the carbon dioxide absorption was 59 kJ/mol-$CO_2$.

Example 13

An absorbing liquid (water solution) was prepared in the same manner as in the Example 1 except that N-(2-methylcyclopentyl)-N-methylaminoethanol was used instead of N-(2-methylcyclopropyl)-N-methylaminoethanol and 2,5-dimethylpiperazine was used instead of piperazine. An absorption amount of carbon dioxide, an absorption speed of carbon dioxide, and heat of reaction were measured under the same conditions by using the same devices as those of the Example 1. The absorption amount of carbon dioxide at 40° C. was 0.34 mol and the absorption amount of carbon dioxide at 80° C. was 0.06 mol, per 1 mol of an amino compound in the absorbing liquid. 0.28 mol carbon dioxide was recovered per 1 mol of the amino compound in the absorbing liquid. The absorption speed of $CO_2$ was 0.028 mol/L/min. The heat of reaction of the carbon dioxide absorption was 59 kJ/mol-$CO_2$.

Example 14

An absorbing liquid (water solution) was prepared in the same manner as in the Example 1 except that N-(2-methylcyclopentyl)-N-methylaminoethanol was used instead of N-(2-methylcyclopropyl)-N-methylaminoethanol and 2,6-dimethylpiperazine was used instead of piperazine. An absorption amount of carbon dioxide, an absorption speed of carbon dioxide, and heat of reaction were measured under the same conditions by using the same devices as those of the Example 1. The absorption amount of carbon dioxide at 40° C. was 0.33 mol and the absorption amount of carbon dioxide at 80° C. was 0.05 mol, per 1 mol of an amino compound in the absorbing liquid. 0.28 mol carbon dioxide was recovered per 1 mol of the amino compound in the absorbing liquid. The absorption speed of $CO_2$ was 0.028 mol/L/min. The heat of reaction of the carbon dioxide absorption was 58 kJ/mol-$CO_2$.

Example 15

An absorbing liquid (water solution) was prepared in the same manner as in the Example 1 except that N-(2-methylcyclopentyl)-N-methylaminoethanol was used instead of N-(2-methylcyclopropyl)-N-methylaminoethanol and azetidine was used instead of piperazine. An absorption amount of carbon dioxide, an absorption speed of carbon dioxide, and heat of reaction were measured under the same conditions by using the same devices as those of the Example 1. The absorption amount of carbon dioxide at 40° C. was 0.29 mol and the absorption amount of carbon dioxide at 80° C. was 0.06 mol, per 1 mol of an amino compound in the absorbing liquid. 0.23 mol carbon dioxide was recovered per 1 mol of the amino compound in the absorbing liquid. The absorption speed of $CO_2$ was 0.026 mol/L/min. The heat of reaction of the carbon dioxide absorption was 59 kJ/mol-$CO_2$.

Example 16

An absorbing liquid (water solution) was prepared in the same manner as in the Example 1 except that N-(2-methylcyclopentyl)-N-methylaminoethanol was used instead of N-(2-methylcyclopropyl)-N-methylaminoethanol and hexahydroazepine was used instead of piperazine. An absorption amount of carbon dioxide, an absorption speed of carbon dioxide, and heat of reaction were measured under the same conditions by using the same devices as those of the Example 1. The absorption amount of carbon dioxide at 40° C. was 0.29 mol and the absorption amount of carbon dioxide at 80° C. was 0.05 mol, per 1 mol of an amino compound in the absorbing liquid. 0.24 mol carbon dioxide was recovered per 1 mol of the amino compound in the absorbing liquid. The absorption speed of $CO_2$ was 0.026 mol/L/min. The heat of reaction of the carbon dioxide absorption was 60 kJ/mol-$CO_2$.

Example 17

An absorbing liquid of 50 ml was prepared by dissolving 30 mass % of N-(2-methylcyclopentyl)-N-methylaminoethanol and 5 mass % of piperazine in water. An absorption amount of carbon dioxide, an absorption speed of carbon dioxide, and heat of reaction were measured under the same conditions as those of the Example 1 by using the same devices as those of the Example 1. The absorption amount of carbon dioxide at 40° C. was 0.37 mol and the absorption amount of carbon dioxide at 80° C. was 0.05 mol, per 1 mol of an amino compound in the absorbing liquid. 0.32 mol carbon dioxide was recovered per 1 mol of the amino compound in the absorbing liquid. The absorption speed of $CO_2$ was 0.035 mol/L/min. The heat of reaction of the carbon dioxide absorption was 61 kJ/mol-$CO_2$.

Example 18

An absorbing liquid of 50 ml was prepared by dissolving 15 mass % of N-(2-methylcyclopentyl)-N-methylaminoethanol and 5 mass % of piperazine in water. An absorption amount of carbon dioxide, an absorption speed of carbon dioxide, and heat of reaction were measured under the same conditions as those of the Example 1 by using the same devices as those of the Example 1. The absorption amount of carbon dioxide at 40° C. was 0.34 mol and the absorption amount of carbon dioxide at 80° C. was 0.06 mol, per 1 mol of an amino compound in the absorbing liquid. 0.28 mol carbon dioxide was recovered per 1 mol of the amino compound in the absorbing liquid. The absorption speed of $CO_2$ was 0.035 mol/L/min. The heat of reaction of the carbon dioxide absorption was 59 kJ/mol-$CO_2$.

Example 19

An absorbing liquid of 50 ml was prepared by dissolving 45 mass % of N-(2-methylcyclopentyl)-N-methylaminoethanol and 1 mass % of piperazine in water. An absorption amount of carbon dioxide, an absorption speed of carbon dioxide, and heat of reaction were measured under the same conditions as those of the Example 1 by using the same devices as those of the Example 1. The absorption amount of carbon dioxide at 40° C. was 0.32 mol and the absorption amount of carbon dioxide at 80° C. was 0.03 mol, per 1 mol of an amino compound in the absorbing liquid. 0.29 mol carbon dioxide was recovered per 1 mol of the amino compound in the absorbing liquid. The absorption speed of $CO_2$ was 0.025 mol/L/min. The heat of reaction of the carbon dioxide absorption was 60 kJ/mol-$CO_2$.

Example 20

An absorbing liquid of 50 ml was prepared by dissolving 45 mass % of N-(2-methylcyclopentyl)-N-methylaminoethanol and 15 mass % of piperazine in water. An absorption amount of carbon dioxide, an absorption speed of carbon dioxide, and heat of reaction were measured under the same conditions as those of the Example 1 by using the same devices as those of the Example 1. The absorption amount of carbon dioxide at 40° C. was 0.40 mol and the absorption amount of carbon dioxide at 80° C. was 0.06 mol, per 1 mol of an amino compound in the absorbing liquid. 0.34 mol carbon dioxide was recovered per 1 mol of the amino compound in the absorbing liquid. The absorption speed of $CO_2$ was 0.032 mol/L/min. The heat of reaction of the carbon dioxide absorption was 62 kJ/mol-$CO_2$.

Example 21

An absorbing liquid of 50 ml was prepared by dissolving 40 mass % of N-(2-methylcyclopentyl)-N-methylaminoethanol, 5 mass % of 2-(isopropylamino) ethanol, and 5 mass % of piperazine in water. An absorption amount of carbon dioxide, an absorption speed of carbon dioxide, and heat of reaction were measured under the same conditions as those of the Example 1 by using the same devices as those of the Example 1. The absorption amount of carbon dioxide at 40° C. was 0.48 mol and the absorption amount of carbon dioxide at 80° C. was 0.07 mol, per 1 mol of an amino compound in the absorbing liquid. 0.41 mol carbon dioxide was recovered per 1 mol of the amino compound in the absorbing liquid. The absorption speed of $CO_2$ was 0.036 mol/L/min. The heat of reaction of the carbon dioxide absorption was 63 kJ/mol-$CO_2$.

Example 22

An absorbing liquid of 50 ml was prepared by dissolving 40 mass % of N-(2-methylcyclopentyl)-N-methylaminoethanol, 5 mass % of 2-(ethylamino) ethanol, and 5 mass % of piperazine in water. An absorption amount of carbon dioxide, an absorption speed of carbon dioxide, and heat of reaction were measured under the same conditions as those of the Example 1 by using the same devices as those of the Example 1. The absorption amount of carbon dioxide at 40° C. was 0.42 mol and the absorption amount of carbon dioxide at 80° C. was 0.06 mol, per 1 mol of an amino compound in the absorbing liquid. 0.36 mol carbon dioxide was recovered per 1 mol of the amino compound in the absorbing liquid. The absorption speed of $CO_2$ was 0.035 mol/L/min. The heat of reaction of the carbon dioxide absorption was 62 kJ/mol-$CO_2$.

Example 23

An absorbing liquid of 50 ml was prepared by dissolving 40 mass % of N-(2-methylcyclopentyl)-N-methylaminoethanol, 5 mass % of 2-amino-2-methyl-1-propanol, and 5 mass % of piperazine in water. An absorption amount of carbon dioxide, an absorption speed of carbon dioxide, and heat of reaction were measured under the same conditions as those of the Example 1 by using the same devices as those of the Example 1. The absorption amount of carbon dioxide at 40° C. was 0.49 mol and the absorption amount of carbon dioxide at 80° C. was 0.07 mol, per 1 mol of an amino compound in the absorbing liquid. 0.42 mol carbon dioxide was recovered per 1 mol of the amino compound in the absorbing liquid. The absorption speed of $CO_2$ was 0.036 mol/L/min. The heat of reaction of the carbon dioxide absorption was 63 kJ/mol-$CO_2$.

Example 24

An absorbing liquid (water solution) was prepared in the same manner as in the Example 1 except that N-(2,5-dimethylcyclopentyl)-N-methylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.43 mol and the absorption amount of carbon dioxide at 80° C. was 0.04 mol, per 1 mol of an amino compound in the absorbing liquid. 0.39 mol carbon dioxide was recovered per 1 mol of the amino compound in the absorbing liquid. The absorption speed of $CO_2$ was 0.034 mol/L/min. The heat of reaction of the carbon dioxide absorption was 59 kJ/mol-$CO_2$.

Example 25

An absorbing liquid (water solution) was prepared in the same manner as in the Example 1 except that N-(2-(hydroxymethyl)cyclopentyl)-N-methylaminoethanol was used instead of N-(2-methylcyclopropyl)-N-methylaminoethanol. An absorption amount of carbon dioxide, an absorption speed of carbon dioxide, and heat of reaction were measured under the same conditions by using the same devices as those of the Example 1. The absorption amount of carbon dioxide at 40° C. was 0.42 mol and the absorption amount of carbon dioxide at 80° C. was 0.07 mol, per 1 mol of an amino compound in the absorbing liquid. 0.35 mol carbon dioxide was recovered per 1 mol of the amino compound in the absorbing liquid. The absorption speed of $CO_2$ was 0.031 mol/L/min. The heat of reaction of the carbon dioxide absorption was 59 kJ/mol-$CO_2$.

Comparative Example 1

A water solution of 50 ml (hereinafter, referred to as an absorbing liquid) was prepared by dissolving 50 mass % of n-butyldiethanolamine and 5 mass % of piperazine in water. After that, an absorption amount of carbon dioxide, an absorption speed of carbon dioxide, and heat of reaction were measured under the same conditions as those of the Example 1 by using the same devices as those of the Example 1. The absorption amount of carbon dioxide at 40° C. was 0.20 mol and the absorption amount of carbon dioxide at 80° C. was 0.08 mol, per 1 mol of an amino compound in the absorbing liquid. 0.12 mol carbon dioxide was recovered per 1 mol of the amino compound in the absorbing liquid. The absorption speed of $CO_2$ was 0.023 mol/L/min. The heat of reaction of the carbon dioxide absorption was 64 kJ/mol-$CO_2$.

The measurement results of the absorption amount of carbon dioxide at 40° C., the absorption amount of carbon dioxide at 80° C., the recovery amount of carbon dioxide, the absorption speed of carbon dioxide, and the heat of reaction in the examples 1 to 25 and the comparative example 1 are shown in Table 1 to 2, together with the contents of the amine compound and the reaction accelerator in the absorbing liquid. Note that in Table 1 to 2, the absorption amount of carbon dioxide and the recovery amount of carbon dioxide are the absorption amount and the recovery amount per 1 mol of the amine compound contained in the absorbing liquid, which are expressed in the number of moles.

TABLE 1

| | Amine compound [mass %] | Reaction Accelerator [mass %] Alkanol amine | Reaction Accelerator [mass %] Hetero Cyclic Amine Compound | $CO_2$ Absorption Amount (40° C.) [mol] | $CO_2$ Absorption Amount (80° C.) [mol] | $CO_2$ Recovery Amount [mol] | $CO_2$ AbsorptionSp Speed [mol/L/min] | Heat of Reaction [kJ/mol] |
|---|---|---|---|---|---|---|---|---|
| Example 1  | 45 | — | 5 | 0.44 | 0.08 | 0.36 | 0.037 | 60 |
| Example 2  | 45 | — | 5 | 0.43 | 0.07 | 0.36 | 0.036 | 62 |
| Example 3  | 45 | — | 5 | 0.45 | 0.05 | 0.40 | 0.035 | 60 |
| Example 4  | 45 | — | 5 | 0.43 | 0.05 | 0.38 | 0.033 | 61 |
| Example 5  | 45 | — | 5 | 0.42 | 0.05 | 0.37 | 0.036 | 59 |
| Example 6  | 45 | — | 5 | 0.43 | 0.05 | 0.38 | 0.033 | 59 |
| Example 7  | 45 | — | 5 | 0.41 | 0.04 | 0.37 | 0.031 | 60 |
| Example 8  | 45 | — | 5 | 0.42 | 0.05 | 0.37 | 0.032 | 59 |
| Example 9  | 45 | — | 5 | 0.41 | 0.04 | 0.37 | 0.031 | 59 |
| Example 10 | 45 | — | 5 | 0.42 | 0.05 | 0.37 | 0.032 | 59 |
| Example 11 | 45 | — | 5 | 0.40 | 0.04 | 0.36 | 0.031 | 61 |
| Example 12 | 45 | — | 5 | 0.38 | 0.06 | 0.32 | 0.031 | 59 |
| Example 13 | 45 | — | 5 | 0.34 | 0.06 | 0.28 | 0.028 | 59 |

TABLE 2

| | Amine compound [mass %] | Reaction Accelerator [mass %] Alkanol amine | Reaction Accelerator [mass %] Hetero Cyclic Amine Compound | $CO_2$ Absorption Amount (40° C.) [mol] | $CO_2$ Absorption Amount (80° C.) [mol] | $CO_2$ Recovery Amount [mol] | $CO_2$ AbsorptionSp Speed [mol/L/min] | Heat of Reaction [kJ/mol] |
|---|---|---|---|---|---|---|---|---|
| Example 14 | 45 | — | 5  | 0.33 | 0.05 | 0.28 | 0.028 | 58 |
| Example 15 | 45 | — | 5  | 0.29 | 0.06 | 0.23 | 0.026 | 59 |
| Example 16 | 45 | — | 5  | 0.29 | 0.05 | 0.24 | 0.026 | 60 |
| Example 17 | 30 | — | 5  | 0.37 | 0.05 | 0.32 | 0.035 | 61 |
| Example 18 | 15 | — | 5  | 0.34 | 0.06 | 0.28 | 0.035 | 59 |
| Example 19 | 45 | — | 1  | 0.32 | 0.03 | 0.29 | 0.026 | 60 |
| Example 20 | 45 | — | 15 | 0.40 | 0.06 | 0.34 | 0.032 | 62 |
| Example 21 | 40 | 5 | 5  | 0.48 | 0.07 | 0.41 | 0.036 | 63 |
| Example 22 | 40 | 5 | 5  | 0.42 | 0.06 | 0.36 | 0.035 | 62 |
| Example 23 | 40 | 5 | 5  | 0.49 | 0.07 | 0.42 | 0.036 | 63 |
| Example 24 | 45 | — | 5  | 0.43 | 0.04 | 0.39 | 0.034 | 59 |
| Example 25 | 45 | — | 5  | 0.42 | 0.07 | 0.35 | 0.031 | 59 |
| Comparative Example 1 | 50 | — | 5 | 0.20 | 0.08 | 0.12 | 0.023 | 64 |

As it is obvious from Table 1 to 2, in the absorbing liquids of the examples 1 to 25 using the tertiary amine compound having the cyclic alkyl group, the recovery amount of carbon dioxide and the absorption speed of carbon dioxide were both high, the heat of reaction at the time of the carbon dioxide absorption was low, and the carbon dioxide absorption performance was excellent.

In the absorbing liquids of the examples 3 to 20 each using the tertiary amine compound having the cyclic alkyl group whose carbon number is 5 to 6 together with the hetero cyclic amine compound such as piperazine, values obtained as the heat of reaction of the carbon dioxide absorption were low such as 58 kJ/mol to 62 kJ/mol, and it has been confirmed that the absorption energy of carbon dioxide is reduced.

On the other hand, in the comparative example 1 using butyldiethanolamine (BDEA) having the linear cyclic alkyl group as the tertiary amine compound, the recovery amount of carbon dioxide was low such as 0.12 mol, the absorption speed of carbon dioxide was small, and the heat of reaction was also high such as 64 kJ/mol.

According to the acid gas absorbent, the acid gas removal method, and the acid gas removal device of at least one of the embodiments described above, it is possible to increase the absorption amount and the absorption speed of acid gas such as carbon dioxide, and to reduce the heat of reaction at the time of the acid gas absorption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acid gas absorbent comprising at least one type of tertiary amine compound represented by the following general formula (1)

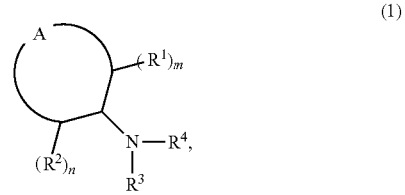

where, in the above formula (1), the cycle A represents a cyclic structure whose carbon number is not less than 3 nor more than 8, $R^1$ and $R^2$ each represent an alkyl group whose carbon number is 1 to 4, $R^3$ represents an alkyl group whose carbon number is 1 to 4, and $R^4$ represents a hydroxyalkyl group;

$R^1$ and $R^2$ are groups coupled to carbon atoms adjacent to a carbon atom forming the cycle A and coupled to a nitrogen atom;

$R^1$ and $R^2$ may be the same or may be different;

"m" and "n" each represent an integer number of 0 (zero) to 2; and $1 \leq m+n \leq 4$.

2. The acid gas absorbent according to claim 1, wherein $R^4$ in the tertiary amine compound represented by the general formula (1) is a 2-hydroxyethyl group.

3. The acid gas absorbent according to claim 1, wherein a content of the tertiary amine compound represented by the general formula (1) is 15 mass % to 50 mass %.

4. The acid gas absorbent according to claim 1, further comprising a reaction accelerator consisting of alkanolamines and/or a hetero cyclic amine compound represented by the following general formula (2), wherein a content of the reaction accelerator is 1 mass % to 15 mass %,

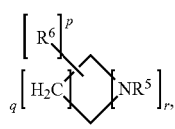

(2)

where, in the formula (2), $R^5$ represents a hydrogen atom or an alkyl group whose carbon number is 1 to 4, $R^6$ represents an alkyl group whose carbon number is 1 to 4 and which is coupled to a carbon atom;

"r" represents an integer number of 1 to 3, "q" represents an integer number of 1 to 4, and "p" represents an integer number of 0 (zero) to 12; and when "r" is 2 to 3, the nitrogen atoms are not directly coupled with each other.

5. The acid gas absorbent according to claim 4, wherein the alkanolamines are at least one type selected from a group consisting of 2-(isopropylamino) ethanol, 2-(ethylamino) ethanol, and 2-amino-2-methyl-1-propanol.

6. The acid gas absorbent according to claim 4, wherein the hetero cyclic amine compound includes at least one type selected from a group consisting of piperazines.

7. The acid gas absorbent according to claim 6, wherein the piperazines are at least one type selected from a group consisting of piperazine, 2-methylpiperazine, 2,5-dimethylpiperazine, and 2,6-dimethylpiperazine.

8. An acid gas removal method, comprising:
bringing gas containing acid gas into contact with the acid gas absorbent according to claim 1 to remove the acid gas from the gas containing the acid gas.

9. An acid gas removal method, comprising:
bringing gas containing acid gas into contact with the acid gas absorbent according to claim 4 to remove the acid gas from the gas containing the acid gas.

* * * * *